G. HOAG.
ANTISKID DEVICE.
APPLICATION FILED MAR. 25, 1920.
1,396,207.
Patented Nov. 8, 1921.
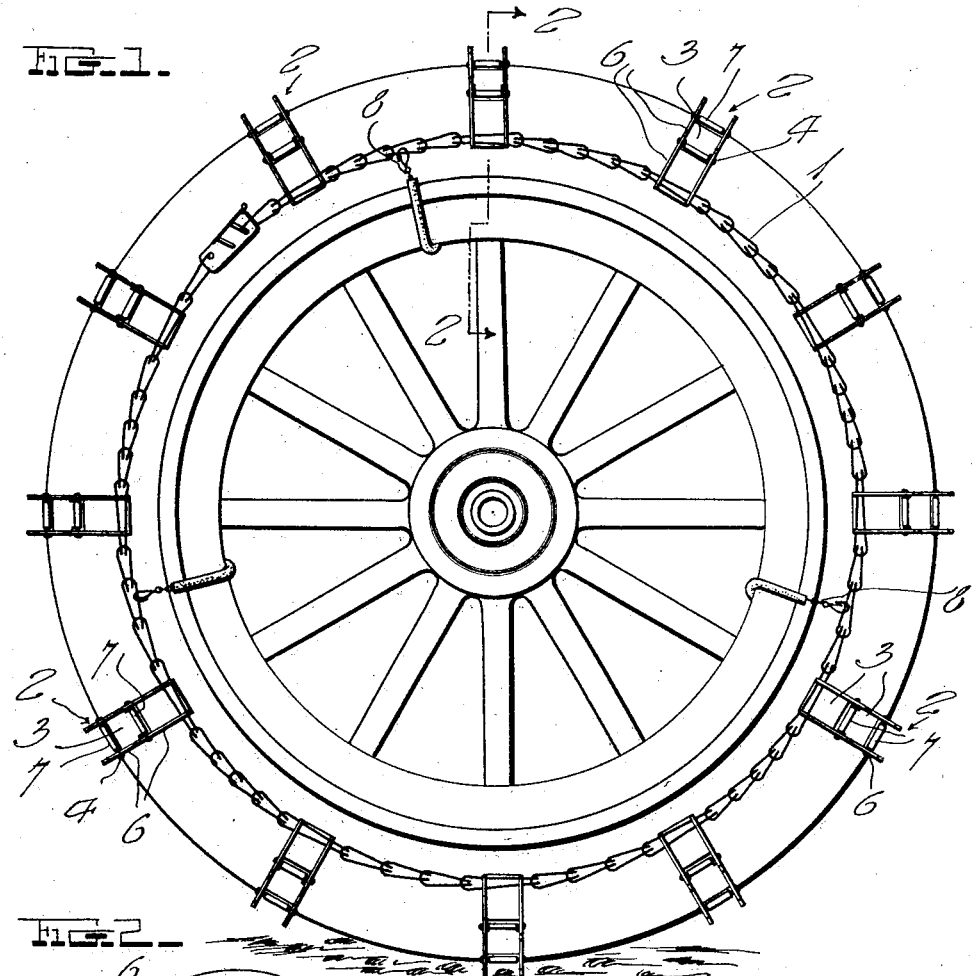
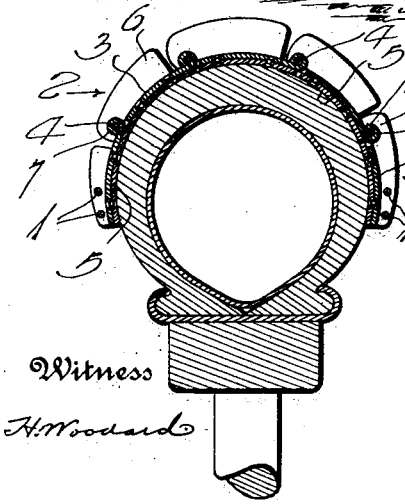
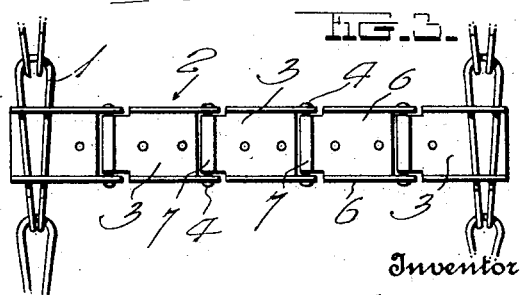
Witness
H. Woodard
Inventor
George Hoag
By H. B. Willson & Co.
Attorneys

UNITED STATES PATENT OFFICE.

GEORGE HOAG, OF UNION GROVE, NEW YORK.

ANTISKID DEVICE.

1,396,207. Specification of Letters Patent. Patented Nov. 8, 1921.

Application filed March 25, 1920. Serial No. 368,804.

*To all whom it may concern:*

Be it known that I, GEORGE HOAG, a citizen of the United States, residing at Union Grove, in the county of Delaware and State of New York, have invented certain new and useful Improvements in Antiskid Devices; and I do declare the following to be a full, clear, and exact description of the invention, such as will enable others skilled in the art to which it appertains, to make and use the same.

This invention relates to an improved anti-skid device for use on automobile wheels and the object of the invention is to generally improve upon and to simplify the construction of such devices by the provision of one which has a greater power of traction; one which is easy to apply and remove; one which will cause as little wear and tear of the tire as is possible, and one which is comparatively inexpensive to both the manufacturer and the user.

Other objects and advantages of the invention will be apparent during the course of the following description.

In the accompanying drawings forming a part of this specification and in which like numerals are employed to designate like parts throughout the same:

Figure 1 is a side elevation of an automobile tire and wheel showing my improved anti-skid device applied thereto.

Fig. 2 is an enlarged cross-sectional view on the plane of the line 2—2 of Fig. 1, looking in the direction of the arrows.

Fig. 3 is a top plan view of a device constructed in accordance with my invention.

In the drawings, wherein for the purpose of illustration is shown a preferred example of my invention, the numeral 1 designates the circumferential side chains which are of the usual construction which are connected together by my anti-skid devices 2 which constitute the cross-chains.

Each of the so-called cross-chains is made up of a plurality of channel members 3 which are joined together by pivot pins 4. The two end members are secured to, and connect the side chains 1. In order to fit the members 3 to the curved surface of the tire, I make them of arcuate formation as shown in the drawings; also, to prevent the device from injuring and wearing the tire casing, I employ felt or leather pads 5, which I secure to the underface of each of the members 3. In making the channel members, I desire to decrease the cost of manufacturing as much as possible, consequently, I stamp them from a sheet of steel so that they may be bent into the shape shown. In forming these channel members, I first take the blank which has been stamped and bend the longitudinal edges thereof at right angles to the bottom, to provide the flanges 6 of the channel which engage and dig into the ground and thus increase the traction of the wheel. It is to be noted that the stamping is such that at one end, the bottom of each channel member extends beyond the flanges and its extremity is rolled to provide a tubular hinge bearing 7 through which the pivots 4 extend. At the other end however, the flanges extend beyond the bottom to provide a space, into which the bearing 7 of the adjacent member extends. The flanges at this end have holes drilled therein for the accommodation of the pivot pins 4. It is to be noted however, that all of the members 3 are not designed alike. This fact will be apparent by examination of the two end members of each cross-chain as these are not provided with bearings 7 and have their flanges at their opposite ends extended to the end of the bottom and provided with two pairs of drilled holes the function of which is to permit one of the links of the side chains to be extended through them and secured in position. While I have described the members 3 as being formed from a stamping, I desire it to be understood that they may be cast or otherwise made. By forming the members 3 as above set forth, it will be seen that they will have entirely free movement with respect to one another and will conform to the various shapes that the tire is subjected to during the period of use. Also, by arranging the flanges of each member transverse of the tire, effective traction will be obtained. Attention is directed to the fact that the flanges of the various channel members will be preferably curved, and of different heights. For instance, the center one will have its flanges rather high in order to overcome the constant wear which is greatest at this point, and at the same time to afford the proper traction at this place which is essential. On the other hand, the flanges of the other members may be less in height as shown, because the wear will, in all probability, be less at these points. Any suitable means such as the chains 8 may be employed for the purpose of retaining my device on the wheel. By making use of these retaining members 8, all circumferential shifting of the device will be prevented, consequently, the wear on the tire will be appreciably reduced.

The device will be applied in the same manner that an ordinary tire chain is, therefore, a description of the application and removal of the device is deemed unnecessary.

It is to be understood that the form of my invention herein shown and described is to be taken as a preferred form of the same, and that various minor changes in the shape, size, and arrangement of parts may be resorted to without departing from the spirit of the invention or the scope of the subjoined claim.

I claim:

An anti-skid device comprising means to extend transversely across the tread of a tire, said means including a plurality of arcuate stamped plates having their opposite longitudinal edges bent laterally outward to form flanges, the latter extending beyond one of the ends of the plates and terminating short of the other end of the plates, the last named ends of the plates being rolled to provide bearings, and these bearings being disposed between the adjacent extended ends of the aforesaid flanges; pivot pins passing through the flanges and said bearings to connect the plates together; and circumferential side chains, links of said chains being anchored to the flanges of the endmost plates.

In testimony whereof I have hereunto set my hand.

GEORGE HOAG.